United States Patent [19]
Takayama

[11] Patent Number: 5,970,176
[45] Date of Patent: Oct. 19, 1999

[54] IMAGE COMMUNICATION APPARATUS

[75] Inventor: Makoto Takayama, Yokohama, Japan

[73] Assignee: Canon Kabushiki Kaisha, Tokyo, Japan

[21] Appl. No.: 08/927,797

[22] Filed: Sep. 11, 1997

Related U.S. Application Data

[63] Continuation of application No. 08/306,390, Sep. 15, 1994, abandoned.

[30] Foreign Application Priority Data

Sep. 20, 1993  [JP]  Japan ..................................... 5-233327

[51] Int. Cl.$^6$ ....................................................... G06K 9/36
[52] U.S. Cl. ............................................................. 382/239
[58] Field of Search ................................ 358/539, 261.2, 358/430, 433, 529, 530; 395/200.44; 370/465; 382/166, 232, 239, 162, 167

[56] References Cited

U.S. PATENT DOCUMENTS

| | | | |
|---|---|---|---|
| 5,182,762 | 1/1993 | Shirai et al. .............................. | 375/122 |
| 5,204,449 | 4/1993 | Yasue et al. .............................. | 395/200 |
| 5,204,949 | 4/1993 | Yause et al. ........................ | 395/200.44 |
| 5,263,100 | 11/1993 | Kim et al. ................................. | 382/166 |
| 5,323,445 | 6/1994 | Nakatsuka .................................. | 348/15 |
| 5,392,284 | 2/1995 | Sugiyama ................................. | 370/465 |
| 5,588,069 | 12/1996 | Katayama et al. ....................... | 358/539 |
| 5,592,302 | 1/1997 | Hirabayashi ............................. | 358/433 |

FOREIGN PATENT DOCUMENTS

| | | |
|---|---|---|
| 2171084 | 7/1990 | Japan . |
| 4223673 | 8/1992 | Japan . |
| 530502 | 2/1993 | Japan . |
| 5136829 | 6/1993 | Japan . |

*Primary Examiner*—Joseph Mancuso
*Assistant Examiner*—Vikkram Bali
*Attorney, Agent, or Firm*—Fitzpatrick, Cella, Harper & Scinto

[57] ABSTRACT

An image communication system which communicates image data on a single line includes a selector, a generator and a communication unit. The selector selects one of a first communication mode and a second communication mode having a communication speed which is faster than that of the first communication mode. The generator generates image data indicating an image of a low resolution when the first communication mode is selected, and generates image data indicating an image of a high resolution when the second communication mode is selected. The communication unit communicates the generated image data using the single line.

15 Claims, 10 Drawing Sheets

BUS WIRING FORM
FORM OF INS NET 64

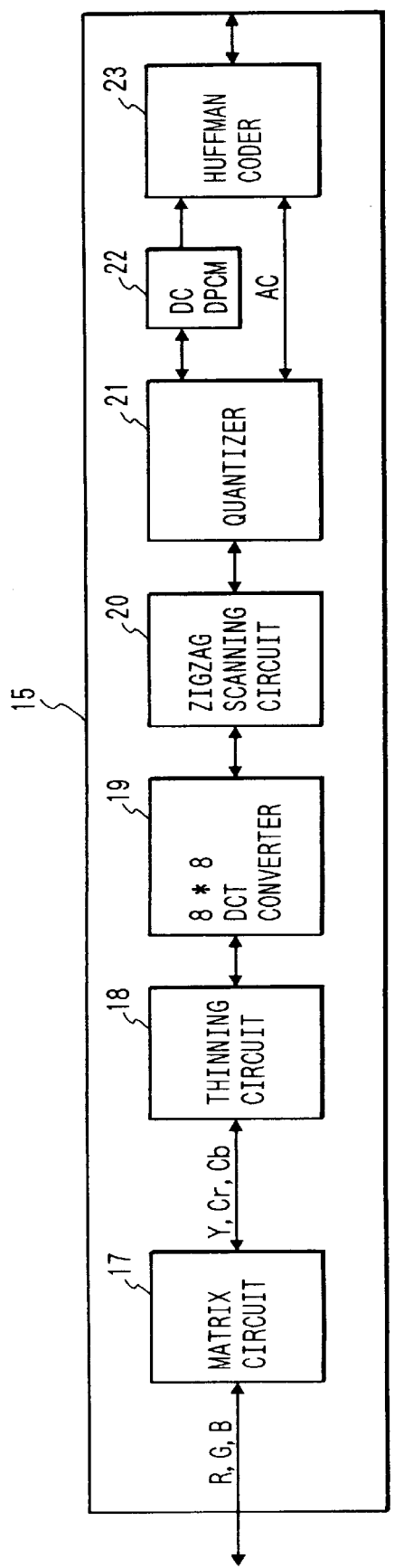

FIG. 5A

| i\j | 1 | 2 | 3 | 4 | 5 | 6 | 7 | 8 |
|---|---|---|---|---|---|---|---|---|
| 1 | 16 | 11 | 10 | 16 | 24 | 40 | 51 | 61 |
| 2 | 12 | 12 | 14 | 19 | 26 | 58 | 60 | 55 |
| 3 | 14 | 13 | 16 | 24 | 40 | 57 | 69 | 56 |
| 4 | 14 | 17 | 22 | 29 | 51 | 87 | 80 | 62 |
| 5 | 18 | 22 | 37 | 56 | 68 | 109 | 103 | 77 |
| 6 | 24 | 35 | 55 | 64 | 81 | 104 | 113 | 92 |
| 7 | 49 | 64 | 76 | 87 | 103 | 121 | 120 | 101 |
| 8 | 72 | 92 | 95 | 98 | 112 | 100 | 103 | 99 |

FIG. 5B

| i\j | 1 | 2 | 3 | 4 | 5 | 6 | 7 | 8 |
|---|---|---|---|---|---|---|---|---|
| 1 | 17 | 18 | 24 | 47 | 66 | 99 | 99 | 99 |
| 2 | 18 | 21 | 26 | 66 | 99 | 99 | 99 | 99 |
| 3 | 24 | 26 | 56 | 99 | 99 | 99 | 99 | 99 |
| 4 | 47 | 66 | 99 | 99 | 99 | 99 | 99 | 99 |
| 5 | 99 | 99 | 99 | 99 | 99 | 99 | 99 | 99 |
| 6 | 99 | 99 | 99 | 99 | 99 | 99 | 99 | 99 |
| 7 | 99 | 99 | 99 | 99 | 99 | 99 | 99 | 99 |
| 8 | 99 | 99 | 99 | 99 | 99 | 99 | 99 | 99 |

FIG. 6A1
| TRANSMISSION SPEED | 1B | 2B | |
|---|---|---|---|
| RESOLUTION | 200DPI | 400DPI | |
| SAMPLING RATIO (Y:Cr:Cb) | 4 : 1 : 1 | 4 : 2 : 2 | 4 : 4 : 4 |
| QUANTIZATION TABLE (Y) | COARSE | STANDARD | FINE |
| QUANTIZATION TABLE (Cr, Cb) | COARSE | STANDARD | FINE |
FIG. 6A2
| MODE \ PARAMETER | a | b | c |
|---|---|---|---|
| TRANSMISSION SPEED | 1B | 1B | 2B |
| RESOLUTION | 200DPI | 400DPI | 400DPI |
| SAMPLING RATIO (Y:Cr:Cb) | 4 : 1 : 1 | 4 : 2 : 2 | 4 : 4 : 4 |
| QUANTIZATION TABLE (Y) | COARSE | FINE | FINE |
| QUANTIZATION TABLE (Cr, Cb) | COARSE | FINE | FINE |
FIG. 6B1
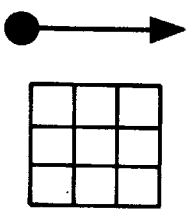
FIG. 6B2
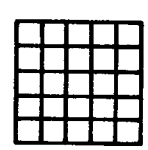
FIG. 6B3
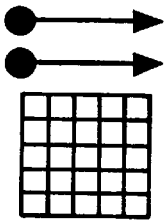

FIG. 8

```
************************************
****  COMMUNICATION MANAGEMENT REPORT  ****
************************************
```

A ~ TRANSMISSION RESULT

| TRANSMISSION NUMBER | B {PARTNER TELEPHONE NUMBER/ SUB-ADDRESS PARTNER TERMINAL IDENTIFIER (TID)} | C {START TIME} | D {COMMUNICATION TIME} | E {COMMUNICATION RESULT} | F {CHARGE} |
|---|---|---|---|---|---|
| 001 | 54827204 | 07/06 16:08 | 00'01 | ##D12 | |
| 002 | 54827204 | 07/06 16:09 | 00'01 | ##D12 | |
| 003 | 54827204 | 07/06 16:09 | 00'01 | ##D12 | |
| 004 | 54827205 | 07/06 16:12 | 02'58 | ↕▦ ↕▦ OK | |
| 005 | 54827205 | 07/06 17:30 | 02'10 | ↕▦ OK | |

G ~ RECEPTION RESULT

| RECEPTION NUMBER | PARTNER TELEPHONE NUMBER/ SUB-ADDRESS PARTNER TERMINAL IDENTIFIER (TID) | C {START TIME} | D {COMMUNICATION TIME} | E {COMMUNICATION RESULT} | F {CHARGE} |
|---|---|---|---|---|---|
| 001 | | 07/06 16:09 | 02'66 | ↕▦ OK | |
| 002 | | 07/06 19:11 | 04'30 | ↕▦ OK | |
| 003 | | 07/08 09:35 | 02'54 | ↕▦ OK | |

FIG. 9

| FIG. 9A |
|---|
| FIG. 9B |

FIG. 9A

KEY FUNCTION LIST

| KEY | FUNCTION |
|---|---|
| [0] ~ [9] [n] | TEN KEY, n INCLUDES OPTIONAL TEN KEY OR #, * |
| [01] ~ [10] | ONE-TOUCH KEY |
| [▲] [▼] [◀] [▶] | SCROLL KEY, THESE KEYS ARE USED TO FEED CHARACTER ON DISPLAY AND TO CHANGE IMAGE OF DISPAY |
| [CLEAR] | THIS KEY IS USED TO CLEAR REGISTERED PARAMETER |
| [SET] | THIS KEY IS USED TO SELECT AND SET MENU |
| [IMAGE QUALITY SELECTION] | THIS KEY IS USED TO SELECT RESOLUTION OF IMAGE, (SAMPLING RATIO, Q FACTOR) HIGH SPEED COMMUNICATION |
| [ALL IMAGE] | THIS KEY IS USED TO REDUCE ALL IMAGES TO TRANSMIT |
| [DENSITY] | THIS KEY IS USED TO SELECT DENSITY OF IMAGE (LIGHT·NORMAL·DARK) |
| [RE-DIAL] | THIS KEY IS USED TO CALL MOST RECENTLY CALLED NUMBER |

FROM FIG. 9A

| | |
|---|---|
| SUB-ADDRESS | THIS KEY IS USED TO INPUT SUBADDRESS |
| SHORTENING | THIS KEY IS USED TO PERFORM TRANSMISSION BY SHORTENING DIAL |
| COMMUNICATION RESULT | THIS KEY IS USED TO DISPLAY TRANSMISSION RESULT ON LCD |
| FUNCTION | THIS KEY IS USED WHEN KEYS OF TEL REGISTER, COMMUNICATION MODE, USER DATA, REPORT ARE USED |
| TEL REGISTER | THIS KEY IS USED TO REGISTER ONE-TOUCH DIAL AND SHORTENING DIAL |
| USER DATA | THIS KEY IS USED TO REGISTER SUBSCRIBER NUMBER, DAY AND HOUR, etc. |
| REPORT | THIS KEY IS USED TO OUTPUT DIAL LIST AND COMMUNICATION MANAGEMENT REPORT |
| ◇ | THIS KEY IS USED TO START TRANSMISSION |
| ⊘ | THIS KEY IS USED TO STOP PRESENT OPERATION |
| ● (PUSH MORE THAN 2.5 SECOND) | THIS KEY IS USED TO RETURN TO STANDBY IMAGE OR TO BREAK TRANSMISSION |

IMAGE COMMUNICATION APPARATUS

This application is a continuation of application Ser. No. 08/306,390 filed Sep. 15, 1994, now abandoned.

BACKGROUND OF THE INVENTION

1. Field of the Invention

The present invention relates to an apparatus for transmitting an image.

2. Related Background Art

FIG. 1 shows an image communication system using an INS net 64.

Communication adapters 2 and 4 are connected to a net 3, and color copy units 1 and 5 are respectively connected to the communication adapters. When an image scanned by the color copy unit 1 is transmitted from the communication adapter 2, data transmitted via the net 3 is received by the communication adapter 4, and is printed by the color copy unit 5.

In such a system, a desired quality of an image to be transmitted varies depending on the purpose. In some cases, high-quality images are required, but in some other cases, low-quality images can be transmitted. On the other hand, a transmission time difference due to an image quality difference corresponds to a cost difference. In this case, a user cannot clearly know whether or not required image quality is properly selected and used, and may pay an unnecessary high cost.

The relationship between the data transmission speed of the circuit of a net 64 and the cost is described below with reference to FIG. 3.

A subscriber circuit 6 of the net 64 consists of a single D channel for control and two B channels for data, and is connected to ISDN equipments A 8, B 9, and C 10 via a DSU 7.

Data transmission results in a large cost difference depending on whether one B channel is used (1B mode) or two B channels are used (2B mode). Depending on an image to be transmitted or its image quality, the 1B and 2B modes sometimes do not result in a transmission time difference. Some users assign highest priority to the transmission time by selecting the 2B channel transmission mode all the time.

As described above, in the conventional system, a user cannot clearly know whether or not required image quality is properly selected and used, and may pay an unnecessary high cost.

In order to improve quality of an image to be transmitted, the amount of image data to be transmitted increases, and the time required for transmitting the image data is undesirably prolonged.

SUMMARY OF THE INVENTION

It is, therefore, an object of the present invention to provide an image communication apparatus which solves the above-mentioned problems individually or together.

It is another object of the present invention to provide an image communication apparatus which improves operability.

It is still another object of the present invention to provide an image communication apparatus which suppresses an increase in time required for data transmission even when the quality of an image to be transmitted is improved.

In order to achieve the above objects, according to a preferred aspect of the present invention, there is disclosed an image communication apparatus comprising: conversion means for processing given image data to convert the image data into code data; output means for outputting the code data converted by the conversion means to a circuit at a predetermined speed; and control means for controlling conversion characteristics of the conversion means in correspondence with the predetermined speed.

It is still another object of the present invention to provide an image communication apparatus which can facilitate management of communication speeds.

Other objects and features of the present invention will become apparent from the following description of the embodiments taken in conjunction with the accompanying drawings.

BRIEF DESCRIPTION OF THE DRAWINGS

FIG. 4 is a block diagram showing a compression/extension circuit 15 shown in FIG. 1;

FIGS. 5A and 5B are views showing a quantizer 21 shown in FIG. 4;

FIGS. 6A1 to 6B3 are views for explaining the operation of the embodiment shown in FIG. 2;

FIG. 8 is a view showing a communication report output from the apparatus shown in FIG. 2; and FIG. 9 is comprised of FIGS. 9A and 9B showing tables summarizing functions executed by keys shown in FIG. 8.

DETAILED DESCRIPTION OF THE PREFERRED EMBODIMENTS

Figure 2:
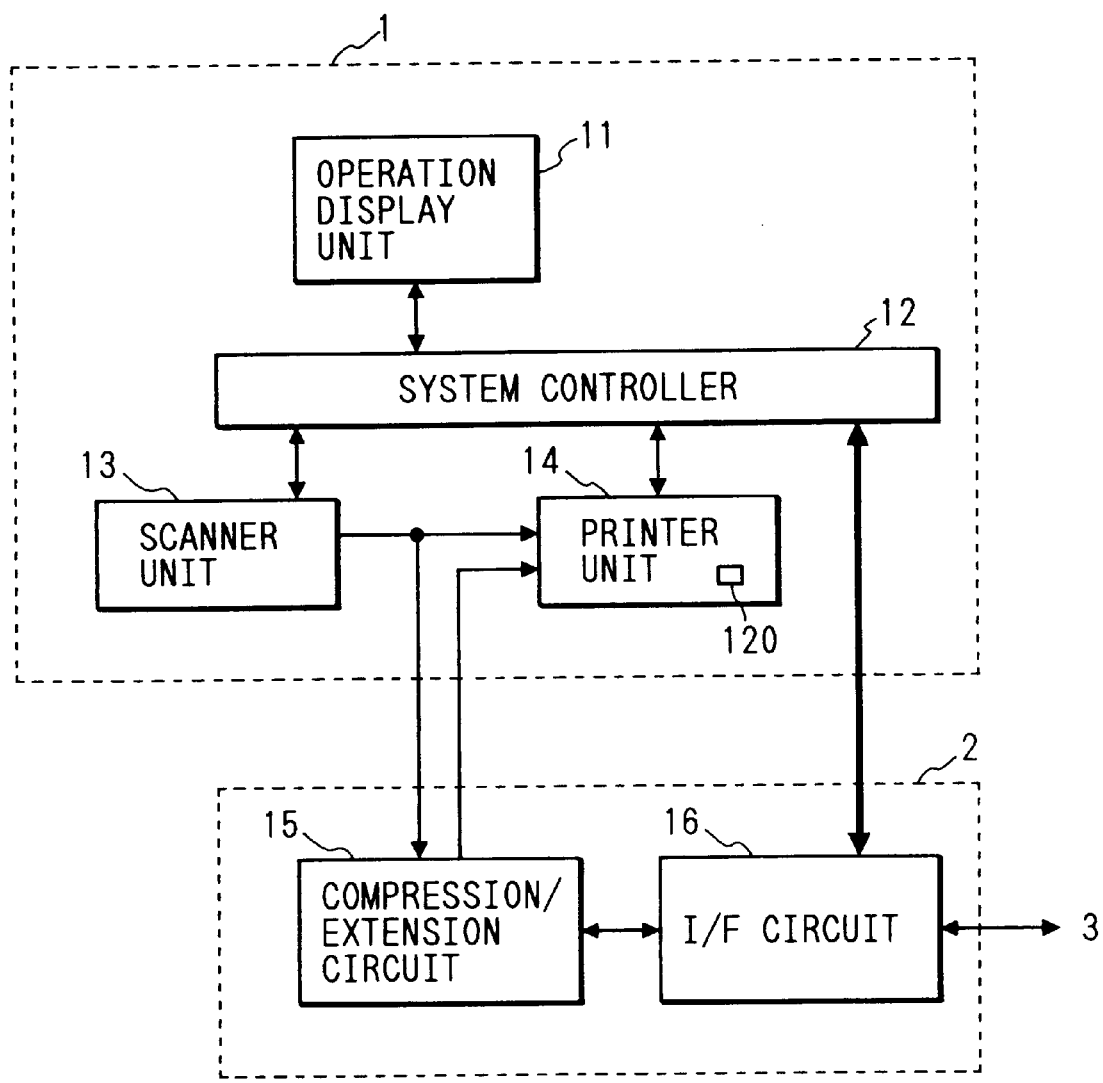
FIG. 2 is a block diagram for explaining the INS net 64.

FIG. 2 is a block diagram showing the arrangement of an embodiment according to the present invention.

In the embodiment shown in FIG. 2, in a transmission mode, when a transmission operation is performed at an operation display unit 11 of a color copy unit 1, image data scanned by a scanner unit 13 is compressed by a compression/extension circuit 15 of a communication adapter 2 under the control of a system controller 12, and the compressed data is transmitted to a net 3 via an I/F circuit 16. The net 3 exemplifies a public circuit, e.g., an ISDN circuit.

In a reception mode, image data from the net 3 is received by the I/F circuit 16 of the communication adapter 2, and the received data is extended or expanded by the compression/extension circuit 15. The extended data is printed by a printer unit 14 of the color copy unit 1.

FIG. 4 is a block diagram showing the detailed arrangement of a compression circuit of the compression/extension circuit 15 shown in FIG. 2. The respective blocks shown in FIG. 4 have functions to be described below, and further have inverse conversion functions thereof.

A matrix circuit 17 converts RGB signals of image data from the scanner unit 13 shown in FIG. 2 into Y, Cr, and Cb signals. A thinning circuit 18 converts the resolution and the ratio of Y:Cr:Cb. An 8×8 DCT converter 19 DCT-converts or DCT-transforms the output signals from the thinning circuit 18. A zigzag scanning circuit 20 converts DCT conversion coefficients output from the DCT converter 19 into onedimensional data. A quantizer 21 quantizes the data output from the circuit 20. A DCDPCM 22 calculates a difference between DC components output from the quantizer 21 and those one block before, and inputs the difference to a Huffman coder 23. The Huffman coder 23 converts the input data into Huffman codes. On the other hand, AC components output from the quantizer 21 are converted into Huffman codes by the Huffman coder. Note that the resolution of the scanner unit of this embodiment can be switched between 200 dpi and 400 dpi.

Figure 1:
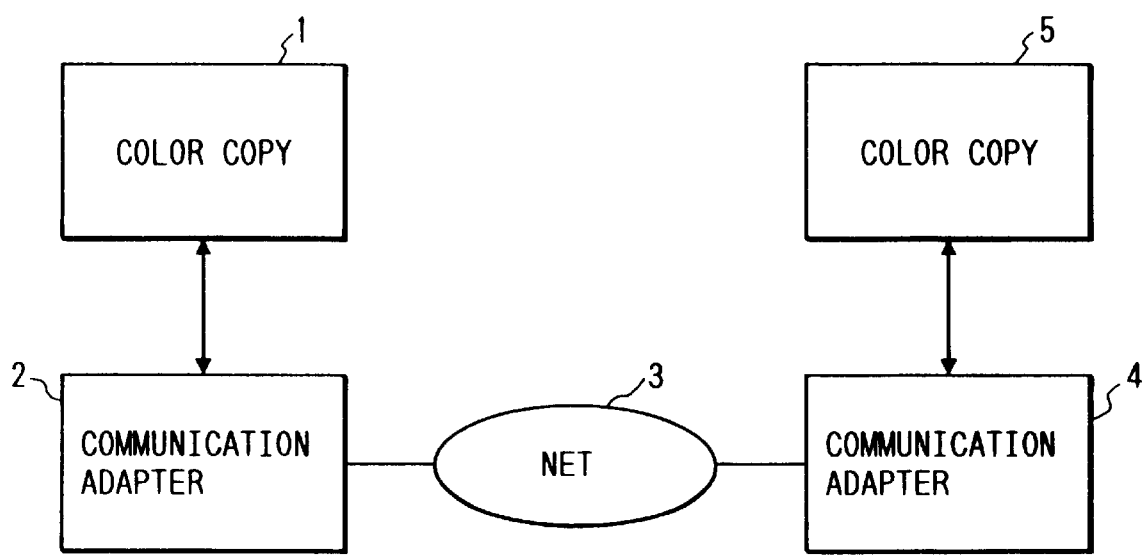
FIG. 1 is a block diagram showing a system using an INS net 64.

Parameters such as circuit image quality on the operation display unit 11 in FIG. 2, which is selected by a user, is explained below with reference to FIG. 6A1.

In the apparatus of this embodiment, the transmission speed is selected between the 1B and 2B modes of the circuit. The resolution is selected between 200 dpi and 400 dpi. The resolution switching operation according to such a selection is realized by the thinning circuit 18 shown in FIG. 4.

The sampling ratio (Y:Cr:Cb) represents the thinning ratio of Cr and Cb with respect to Y, and is selected from 4:1:1, 4:2:2, and 4:4:4. The control of the sampling ratio according to such a selection is realized by the thinning circuit 18 shown in FIG. 4.

A quantization table (Y) is used for quantizing Y, and is selected from three different tables, i.e., coarse, standard, and fine tables to change the value of the quantization step of the quantizer 21 shown in FIG. 4.

FIG. 5A shows an example of quantization coefficients used for a Y quantizer. The table shown in FIG. 5A is a quantization table for 8×8 DCT coefficients. For example, a value designated by (i, j)=(1, 1) is a value of one step of the quantizer corresponding to a DC component, and is "16" in FIG. 5A. When (i, j)=(8, 8), "99" is a value of one step. As shown in FIG. 5A, the quantization step becomes coarser as the frequency becomes higher.

In this embodiment, the coarseness of the quantizer is determined in one of three modes by changing the quantization coefficients, in other words, the quantization steps used for the quantizer. That is, the Y compression ratio is changed. A quantization table (Cr, Cb) in FIG. 6A1 includes parameters for quantizing Cr and Cb, and is selected from three tables, i.e., coarse, standard, and fine tables to change the value of the quantization step used in the quantizer shown in FIG. 4.

FIG. 5B shows an example of the quantization table used for Cr and Cb quantizers.

As described above, in this embodiment, when color image data is transmitted using an ISDN circuit, parameters for determining the transmission speed of a circuit to be used and image quality is set in advance before transmission.

That is, the compression ratios of Cr and Cb are changed. More specifically, this control is realized by selecting one of the coarse, standard, and fine quantization tables shown in FIG. 6A1.

According to this embodiment, since a user selects parameters of image quality such as the data transmission speed of a circuit to be used, the resolution of an image to be transmitted, the sampling ratio, the compression ratio, and the like, an image having a quality required by the user is transmitted using a proper time period, and the user is prevented from paying an unnecessary cost.

Another Embodiment

FIG. 6A2 shows another embodiment.

FIG. 6A2 shows a table for explaining the operation of this embodiment. As shown in this table, in this embodiment, combinations of the transmission speeds, resolutions, sampling ratios, and quantization tables are set in correspondence with three modes a, b, and c. In the mode a, although the transmission speed is low, the amount of an image to be transmitted is smallest, and the transmission time becomes shortest. In the mode b, the amount of an image to be transmitted is set to be larger than that in the mode a to set higher image quality than in the mode a, thus obtaining standard image quality. In the mode c, the transmission time is half that in the modes a and b, and image quality is the best of the three modes.

In the apparatus of this embodiment, the scanner unit 13, and the sampling ratio of the thinning circuit 18 and the quantization characteristics of the quantizer 21 in the compression/extension circuit 15 are changed in correspondence with these modes, as shown in the table shown in FIG. 6A2.

When a desired one of the three modes is selected, a user can select a proper time and image quality.

Figure 3:
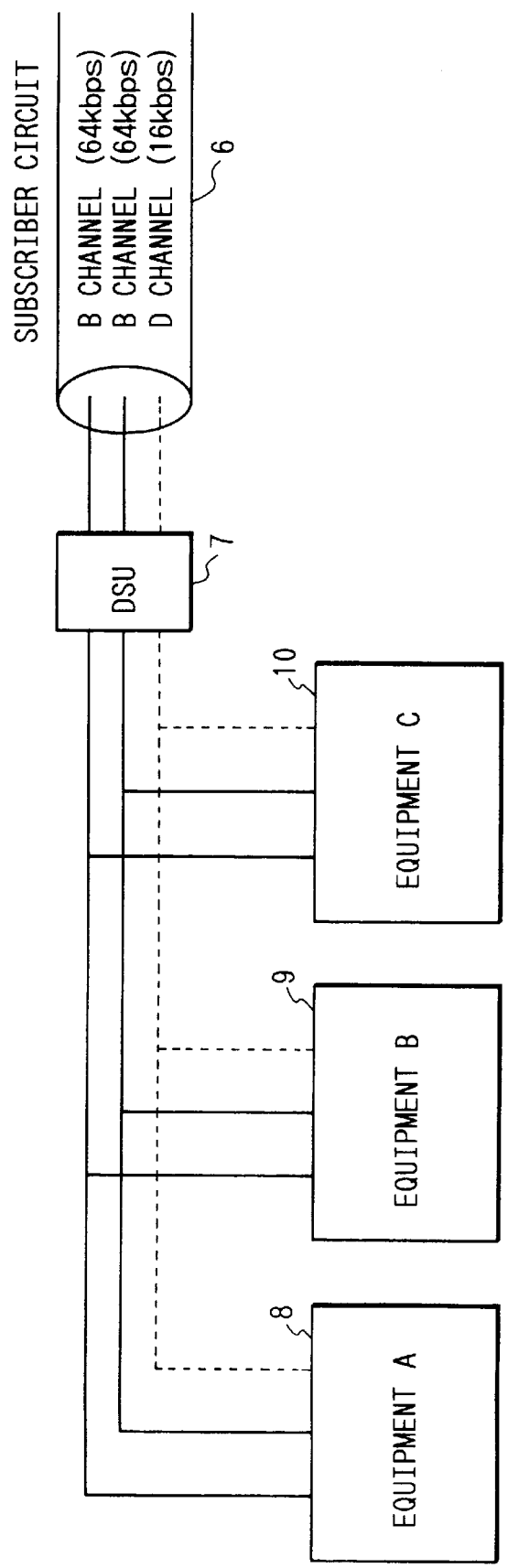
FIG. 3 is a block diagram showing the form according to an embodiment of the present invention.

FIGS. 6B1, 6B2, and 6B3 show examples of marks displayed on the operation display unit 11 shown in FIG. 3, which respectively correspond to the modes a, b, and c shown in the table in FIG. 6A2.

Figure 7:
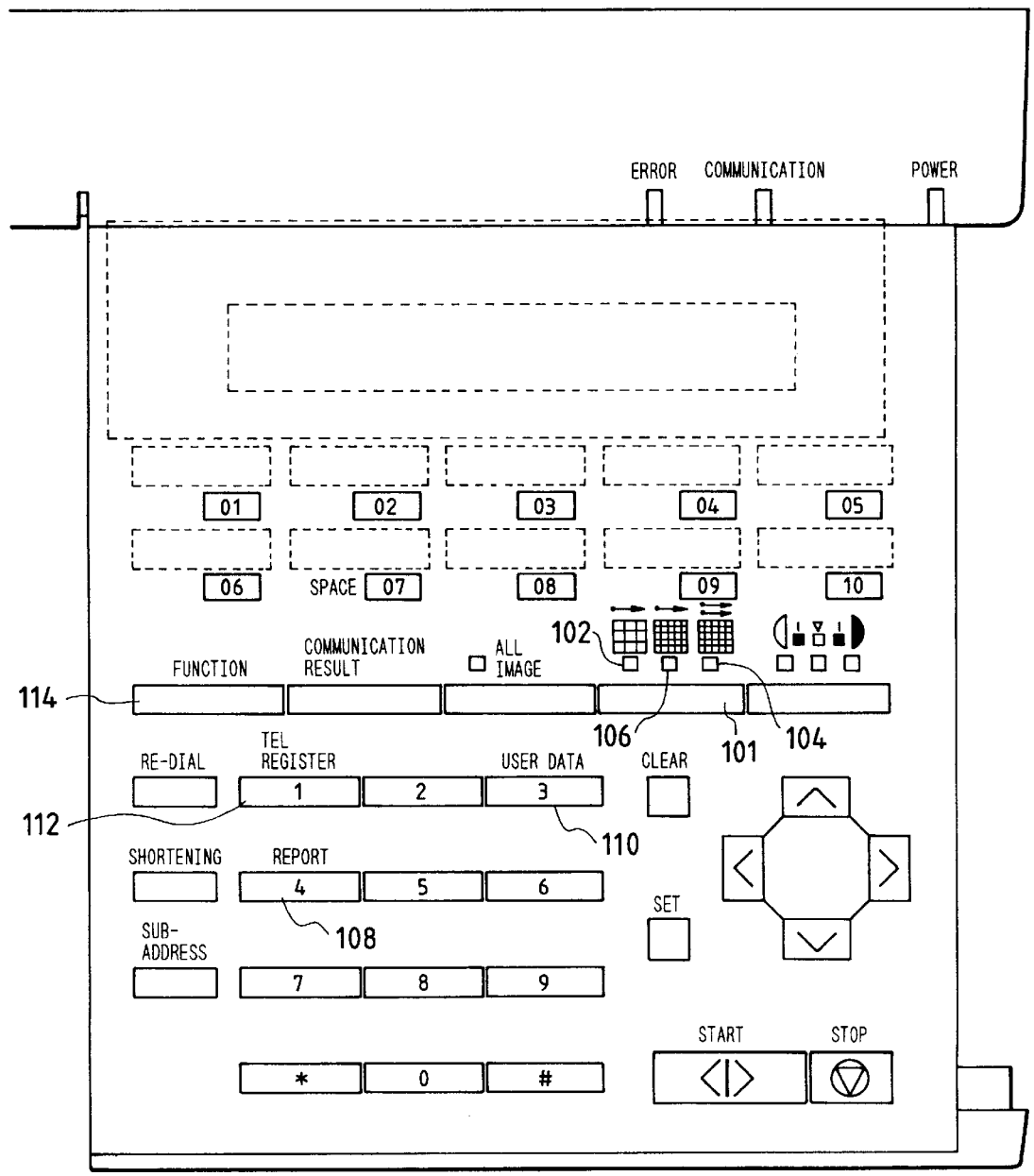
FIG. 7 is a plan view showing an operation display unit 11 of the embodiment shown in FIG. 2.

FIG. 7 is a detailed plan view of the operation display unit 11 (FIG. 3) including selection keys of the modes shown in FIG. 6A2 and the marks shown in FIGS. 6B1, 6B2, and 6B3.

Note that FIGS. 9A and 9B show a list of functions of the operation display unit 11 in correspondence with FIG. 7.

The functions particularly associated with the arrangement of this embodiment of those of the keys shown in FIGS. 9A and 9B is explained below.

Referring to FIG. 7, an image quality selection key 101 is used for selecting one of the modes a, b, and c shown in the table in FIG. 6A2.

Indication lamps 102, 104, and 106 indicate the selection state of the image quality selection key 101. A report key 108 is used for outputting a communication management report from the printer unit 14 shown in FIG. 2. A key 110 is used for registering subscriber numbers, date, and the like. A key 112 is used for registering one-touch dials and shortening (abbreviated) dials. Of the above-mentioned keys, the keys 108, 110, and 112 are used commonly to ten-keys, and when one of the keys 108, 110, and 112 is depressed while depressing a function key 114, a corresponding one of the above-mentioned TEL registration, user data, and report functions is executed.

FIG. 8 shows a communication management report which is output from the printer unit 14 onto a recording medium (e.g., a paper sheet) under the control of the system controller 12 in accordance with an instruction from the operation display unit 11 shown in FIG. 2.

Note that the system controller 12 includes a memory for storing a communication result and a timepiece unit for managing the start time of the communication and the time required for the communication so as to output the communication management report.

On this report, a transmission result and a reception result are recorded, and also, a transmission number, start time, communication time, transmission mode, and charge are recorded as communication information.

In FIG. 8, A represents a transmission number indicating the transmission order, B represents a partner telephone number upon transmission indicated by the transmission number, C represents a transmission start time, D represents a time required for transmission, and E represents a communication result. In the communication result E, "##D12" of this embodiment represents a redial operation. Also, each mark in the communication result E corresponds to one of the marks shown in FIGS. 6B1, 6B2, and 6B3. In addition, G represents a number upon reception.

The communication report of this embodiment is output from the printer unit 14 in accordance with an instruction from the system controller 12 shown in FIG. 2.

The printer unit 14 of this embodiment incorporates a character generator to print out the communication report.

In this embodiment, since the marks shown in FIGS. 6B1, 6B2, and 6B3 are printed in the communication report, a user can confirm the communication speed, resulting in convenience.

In the communication management report of this embodiment, data for a plurality of communications are recorded on a single recording sheet. However, the present invention is not limited to this. For example, data for one communication may be recorded on a single recording sheet.

In this embodiment, the compression ratio is changed by changing the value of the quantization table. Alternatively, a Huffman coding table may be changed.

In this embodiment, parameters such as the resolution, sampling ratio, compression ratio, and the like are changed in correspondence with a manual change operation of the communication speed. However, the present invention is not limited to this. For example, the above-mentioned parameters may be changed in correspondence with an automatic change operation of the communication speed.

As described above, according to this embodiment, a user can select parameters of image quality such as the data transmission speed of a circuit to be used, the resolution of an image to be transmitted, the sampling ratio, the compression ratio, and the like, and can transmit an image of proper quality using a proper time.

What is claimed is:

1. An image communication apparatus comprising:

generating means for generating color image data;

manual selecting means for manually selecting one of a plurality of transmission modes each of which defines at least, speed at which the color image data is transmitted, resolution representing the color image data, sampling ratio of a plurality of color components constituting the color image data and a quantizing method which is executed to the color image data, each of the speed, the resolution, the sampling ratio and the quantizing method existing in plurality, and at least one of the speed, the resolution, the sampling ratio and the quantizing method being different in each of the plurality of transmission modes;

resolution changing means for changing the resolution of the color image data according to the transmission mode selected by said manual selecting means;

sampling ratio changing means for changing the sampling ratio of the plurality of color components constituting the color image data according to the transmission mode selected by said manual selecting means;

quantizing means for quantizing the color image data in the quantizing method corresponding to the transmission mode selected by said manual selecting means; and transmission means for transmitting the color image data at a speed corresponding to the transmission mode selected by said manual selecting means.

2. An image communication method comprising:

a generating step of generating color image data;

a manual selecting step of manually selecting one of a plurality of transmission modes each of which defines at least, speed at which the color image data is transmitted, resolution representing the color image data, sampling ratio of a plurality of color components constituting the color image data and a quantizing method which is executed to the color image data, each of the speed, the resolution, the sampling ratio and the quantizing method existing in plurality, and at least one of the speed, the resolution, the sampling ratio and the quantizing method being different in each of the plurality of transmission modes;

a resolution-changing step of changing the resolution of the color image data according to the transmission mode selected by said manual selecting step;

a sampling ratio changing step of changing the sampling ratio of the plurality of color components constituting the color image data according to the transmission mode selected by said manual selecting step;

a quantizing step of quantizing the color image data in the quantizing method corresponding to the transmission mode selected by said manual selecting step; and a transmission step of transmitting the color image data at a speed corresponding to the transmission mode selected by said manual selecting step.

3. An image communication apparatus comprising:

generating means for generating color image data;

manual selecting means for manually selecting one of a plurality of transmission modes each of which defines at least, speed at which the color image data is transmitted, sampling ratio of a plurality of color components constituting the color image data and a quantizing method which is executed to the color image data, each of the speed, the sampling ratio and the quantizing method existing in plurality, and at least one of the speed, the resolution, the sampling ratio and the quantizing method being different in each of the plurality of transmission modes;

sampling ratio changing means for changing the sampling ratio of the plurality of color components constituting the color image data according to the transmission mode selected by said manual selecting means;

quantizing means for quantizing the color image data in the quantizing method corresponding to the transmission mode selected by said manual selecting means, and transmission means for transmitting the color image data at a speed corresponding to the transmission mode selected by said manual selecting means.

4. An image communication method comprising:

a generating step of generating color image data;

a manual selecting step of manually selecting one of a plurality of transmission modes each of which defines at least, speed at which the color image data is transmitted, sampling ratio of a plurality of color components constituting the color image data and a quantizing method which is executed to the color image data, each of the speed, the sampling ratio and the quantizing method existing in plurality, and at least one of the speed, the resolution, the sampling ratio and the quantizing method being different in each of the plurality of transmission modes;

a sampling ratio changing step of changing the sampling ratio of the plurality of color components constituting the color image data according to the transmission mode selected by said manual selecting step;

a quantizing step of quantizing the color image data in the quantizing method corresponding to the transmission mode selected by said manual selecting step, and a transmission step of transmitting the color image data at a speed corresponding to the transmission mode selected by said manual selecting means.

5. An image communication apparatus comprising:

generating means for generating color image data;

manual selecting means for manually selecting one of a plurality of transmission modes each of which defines at least, speed at which the color image data is transmitted, resolution representing the color image data, sampling ratio of a plurality of color components constituting the color image data, each of the speed, the resolution and the sampling ratio existing in plurality, and at least one of the speed, the resolution, the sampling ratio and the quantizing method being different in each of the plurality of transmission modes;

resolution changing means for changing the resolution of the color image data according to the transmission mode selected by said manual selecting means;

sampling ratio changing means for changing the sampling ratio of the plurality of color components constituting the color image data according to the transmission mode selected by said manual selecting means; and transmission means for transmitting the color image data at a speed corresponding to the transmission mode selected by said manual selecting means.

6. An image communication method comprising;

a generating step of generating color image data;

a manual selecting step of manually selecting one of a plurality of transmission modes each of which defines at least, speed at which the color image data is transmitted, resolution representing the color image data, sampling ratio of a plurality of color components constituting the color image data, each of the speed, the resolution and the sampling ratio existing in plurality, and at least one of the speed, the resolution, the sampling ratio and the quantizing method being different in each of the plurality of transmission modes;

a resolution changing step of changing the resolution of the color image data according to the transmission mode selected by said manual selecting step;

a sampling ratio changing step of changing the sampling ratio of the plurality of color components constituting the color image data according to the transmission mode selected by said manual selecting step; and a transmission step of transmitting the color image data at the speed corresponding to the transmission mode selected by said manual selecting step.

7. An image communication apparatus comprising:

generating means for generating color image data;

manual selecting means for manually selecting one of a plurality of transmission modes each of which defines at least, resolution representing the color image data, sampling ratio of a plurality of color components constituting the color image data and a quantizing method which is executed to the color image data, each of the resolution, the sampling ratio and the quantizing method existing in plurality, and at least one of the resolution, the sampling ratio and the quantizing method being different in each of the plurality of transmission modes;

resolution changing means for changing the resolution of the color image data according to the transmission mode selected by said manual selecting means;

sampling ratio changing means for changing the sampling ratio of the plurality of color components constituting the color image data according to the transmission mode selected by said manual selecting means;

quantizing means for quantizing the color image data in the quantizing method corresponding to the transmission mode selected by said manual selecting means; and transmission means for transmitting the color image data at a speed corresponding to the transmission mode selected by said manual selecting means.

8. An image communication method comprising:

a generating step of generating color image data;

a manual selecting step of manually selecting one of a plurality of transmission modes each of which defines at least, resolution representing the color image data, sampling ratio of a plurality of color components constituting the color image data and a quantizing method which is executed to the color image data, each of the resolution, the sampling ratio and the quantizing method existing in plurality, and at least one of the resolution, the sampling ratio and the quantizing method being different in each of the plurality of transmission modes;

a resolution changing step of changing the resolution of the color image data according to the transmission mode selected by said manual selecting step;

a sampling ratio changing step of changing the sampling ratio of the plurality of color components constituting the color image data according to the transmission mode selected by said manual selecting step;

a quantizing step of quantizing the color image data in the quantizing method corresponding to the transmission mode selected by said manual selecting step; and a transmission step of transmitting the color image data at a speed corresponding to the transmission mode selected by said manual selecting step.

9. An image communication apparatus comprising:

generating means for generating color image data;

manual selecting means for manually selecting one of a plurality of transmission modes each of which defines at least, speed at which the color image data is transmitted, resolution representing the color image data and a quantizing method which is executed to the color image data, each of the speed, the resolution and the quantizing method existing in plurality, and at least one of the speed, the resolution and the quantizing method being different in each of the plurality of transmission modes;

resolution changing means for changing the resolution of the color image data according to the transmission mode selected by said manual selecting means;

quantizing means for quantizing the color image data in the quantizing method corresponding to the transmission mode selected by said manual selecting means; and transmission means for transmitting the color image data at a speed corresponding to the transmission mode selected by said manual selecting means.

10. An image communication method comprising:

a generating step of generating color image data;

a manual selecting step of manually selecting one of a plurality of transmission modes each of which defines at least, speed at which the color image data is transmitted, resolution representing the color image data and a quantizing method which is executed to the color image data, each of the speed, the resolution and the quantizing method existing in plurality, and at least one of the speed, the resolution and the quantizing method being different in each of the plurality of transmission modes;

a resolution changing step of changing the resolution of the color image data according to the transmission mode selected by said manual selecting step;

a quantizing step of quantizing the color image data in the quantizing method corresponding to the transmission mode selected by said manual selecting step; and a transmission step of transmitting the color image data at a speed corresponding to the transmission mode selected by said manual selecting step.

11. An apparatus according to claim 1, wherein said image communication apparatus has at least three communication modes.

12. An apparatus according to claim 3, wherein said image communication apparatus has at least three communication modes.

13. An apparatus according to claim 5, wherein said image communication apparatus has at least three communication modes.

14. An apparatus according to claim 7, wherein said image communication apparatus has at least three communication modes.

15. An apparatus according to claim 9, wherein said image communication apparatus has at least three communication modes.

* * * * *

UNITED STATES PATENT AND TRADEMARK OFFICE
CERTIFICATE OF CORRECTION

PATENT NO. : 5,970,176
DATED : October 19, 1999
INVENTOR(S) : Makoto Takayama

It is certified that error appears in the above-identified patent and that said Letters Patent is hereby corrected as shown below:

Title page,
AT [56] REFERENCES CITED

FOREIGN PATENT DOCUMENTS

"2171084" should read --2-171084--;
"4223673" should read --4-223673--;
"530502" should read --5-30502--; and
"5136829" should read --5-136829--.

COLUMN 7

Line 28, "comprising;" should read --comprising:--.

Signed and Sealed this

Sixth Day of February, 2001

Attest:

Q. TODD DICKINSON

Attesting Officer

Director of Patents and Trademarks